United States Patent
Kluftinger et al.

(10) Patent No.: US 10,844,895 B2
(45) Date of Patent: Nov. 24, 2020

(54) CLAMPING SLEEVE AND A METHOD FOR PRODUCING A CLAMPING SLEEVE

(71) Applicant: KNORR-BREMSE SYSTEME FUER NUTZFAHRZEUGE GMBH, Munich (DE)

(72) Inventors: Andre Kluftinger, Kleinheubach (DE); Christoph Huber, Munich (DE); Werner Eberhard, Schwabmuenchen (DE); Georg Stammel, Langerringen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 663 days.

(21) Appl. No.: 15/565,083

(22) PCT Filed: Apr. 11, 2016

(86) PCT No.: PCT/EP2016/057869
§ 371 (c)(1),
(2) Date: Oct. 6, 2017

(87) PCT Pub. No.: WO2016/162551
PCT Pub. Date: Oct. 13, 2016

(65) Prior Publication Data
US 2018/0112698 A1    Apr. 26, 2018

(30) Foreign Application Priority Data
Apr. 10, 2015  (DE) ................. 10 2015 105 550

(51) Int. Cl.
*F16B 21/07* (2006.01)
*F16B 2/24* (2006.01)
*G01P 1/02* (2006.01)

(52) U.S. Cl.
CPC .............. *F16B 21/07* (2013.01); *F16B 2/245* (2013.01); *G01P 1/026* (2013.01)

(58) Field of Classification Search
CPC ........ F16B 21/07; F16B 21/075; F16B 19/02; F16B 2/245; F16B 13/02; F16B 13/025;
(Continued)

(56) References Cited

U.S. PATENT DOCUMENTS 3,633,153 A     1/1972  Ahmed
3,768,845 A *  10/1973  Gilliland ................... F16B 9/02
                                                                                     403/372
(Continued)

FOREIGN PATENT DOCUMENTS

DE    2024364    12/1970
DE    2715426    11/1977
(Continued)

OTHER PUBLICATIONS

"World Automotive Technology Development Tracking Research: Lightweight", edited by SAE-China, Beijing Institute of Technology Press, May 2013, pp. 162-163.
(Continued)

*Primary Examiner* — Jonathan P Masinick
(74) *Attorney, Agent, or Firm* — Norton Rose Fulbright US LLP; Gerard Messina

(57) ABSTRACT

A clamping sleeve and a method for making the same, in which the clamping sleeve is insertable into a bore and which is suitable for receiving and for displaceably mounting a sensor in the bore, the bore defining a radial direction and an axial direction, including: a sleeve body to receive the sensor; and at least one spring tongue with a free end and a fastening end, wherein the fastening end is fastened to the sleeve body and the free end is swingable against a spring force such that the spring tongue supports and displaceably (Continued)

mounts the sensor against the bore while exerting the spring force if the clamping sleeve is situated, together with the sensor, at least partially in the bore; wherein the clamping sleeve is formed from rolled steel so that a rolling direction of the rolled steel extends between the fastening end and the free end.

15 Claims, 8 Drawing Sheets

(58) Field of Classification Search
CPC ............ F16B 7/0413; Y10T 403/7047; Y10T 403/7049; Y10T 403/7061; Y10T 403/453; Y10T 403/40; Y10T 403/405; F16D 1/0829; F16D 1/0835; F16D 2001/062
See application file for complete search history.

(56) References Cited

U.S. PATENT DOCUMENTS

| | | | |
|---|---|---|---|
| 4,075,520 A | | 2/1978 | Davy, Sr. |
| 4,376,254 A | * | 3/1983 | Hellmann ............... H01R 39/14 |
| | | | 310/219 |
| 5,803,419 A | | 9/1998 | Nicot |
| 6,463,818 B1 | * | 10/2002 | Stagg ................... G01D 11/245 |
| | | | 16/2.1 |
| 6,523,425 B1 | | 2/2003 | Kubik |
| 6,792,650 B2 | * | 9/2004 | Stagg ........................ B60P 3/36 |
| | | | 16/2.1 |
| 7,815,391 B2 | * | 10/2010 | Kauppila .............. F16B 13/025 |
| | | | 403/367 |
| 8,052,447 B2 | | 11/2011 | Feve-Hohmann |
| 8,120,352 B2 | * | 2/2012 | Schleyer ............ G01D 5/24423 |
| | | | 324/207.25 |
| 8,282,308 B2 | * | 10/2012 | Slayne .................... F16B 19/02 |
| | | | 403/372 |
| 8,337,112 B2 | * | 12/2012 | Kauppila .............. F16B 13/126 |
| | | | 403/367 |
| 2003/0047014 A1 | | 3/2003 | Stagg et al. |
| 2005/0040650 A1 | * | 2/2005 | Chang ................... F16B 7/0413 |
| | | | 285/340 |
| 2011/0023265 A1 | | 2/2011 | Singbartl |
| 2015/0211558 A1 | * | 7/2015 | Garrison .................. F16B 2/22 |
| | | | 24/564 |

FOREIGN PATENT DOCUMENTS

| | | | | |
|---|---|---|---|---|
| DE | 8815130 | | 12/1988 | |
| DE | 3919109 | | 12/1990 | |
| DE | 102006020608 | | 11/2007 | |
| DE | 102007018815 | | 10/2008 | |
| DE | 102007056340 | | 5/2009 | |
| DE | 102008032837 | | 1/2010 | |
| DE | 102008054000 | | 5/2010 | |
| DE | 102011116286 | | 4/2013 | |
| DE | 102012024762 | | 6/2014 | |
| DE | 102012024762 A1 | * | 6/2014 | ............. G01D 11/30 |
| FR | 2732458 | | 10/1996 | |
| JP | 08230630 | | 9/1996 | |
| JP | H08230630 A | | 9/1996 | |

OTHER PUBLICATIONS

International Search Report dated Jun. 6, 2016, of the corresponding International Application PCT/EP2016/057869 filed Apr. 11, 2016.
Wabco: Das Anti-Blockier-System, Version 002, Feb. 2011, 36 pages.
Wabco:, Product Catalog, 8150201703, Version 2, Oct. 2011, pp. 49-50.
Wabco: Sensor Set mit Klemmbuchse sowie Montagefett, Jul. 22, 2013.
Thyssen Krupp Nirosta 4310 Produktdatenblatt, May 13, 2008, pp. 46-47.
Stahl 1.4310 Produktdatenblatt Lamineries Matthey SA, Ausgabe Jan. 2013, pp. 1-3.
Rostbeständiger, hartgewalzter Federbandstahl Werkstoff-Nr. 1.4310, Produktdatenblatt Notz Metall, Dec. 19, 2009.
Legierung Brush 190 Produktdatenblatt Lamineries Matthey SA, Ausgabe Jan. 2013.
TruService Stanzwerkzeuge Katalog Jun. 17, 2014.
Marging Stahl Durinox Produktdatenblatt Lamineries Matthey SA, Ausgabe Jan. 2013.
German Office Action dated Jan. 20, 2016 of priority German Application No. 102015105550.3 filed Apr. 10, 2015.

* cited by examiner

CLAMPING SLEEVE AND A METHOD FOR PRODUCING A CLAMPING SLEEVE

FIELD OF THE INVENTION

The present invention relates to a clamping sleeve and to a method for producing a clamping sleeve.

BACKGROUND INFORMATION

Clamping sleeves are used in order to fasten, for example, sensors in a (receiving) bore. Such sensors can be rotational speed sensors, for example, which measure a rotational speed of a wheel which moves along the bore. In order to fix these sensors firmly within the bore, use is made of clamping sleeves which are arranged between the sensor and the bore and have spring tabs which support the sensor within the bore or hold it under pressure in the bore.

Such clamping sleeves are intended to be able to be used easily, to withstand strong vibrations without fatigue phenomena over a relatively long period of time (i.e. have high dynamics) and additionally be able to be produced as a mass-produced product with little effort.

In the case of conventional clamping sleeves, use is made, in particular, of nonferrous metal alloys which have to date met these requirements only to an insufficient extent. For example, the material used is copper beryllium (CuBe), which has only a low modulus of elasticity and therefore has to be formed with a relatively large material thickness in order to be able to permanently withstand the vibrations. In addition, this material is relatively expensive and complicated to produce, which means that there is a need for alternatives.

SUMMARY OF THE INVENTION

It is an object of the present invention to provide a clamping sleeve which overcomes the disadvantages of the conventional clamping sleeves and can be produced in particular as a mass-produced product with little effort.

The aforementioned object may be achieved by a clamping sleeve as described herein and a method for producing the same as described herein.

The present invention relates to a clamping sleeve which can be inserted into a bore and which is suitable for receiving and displaceably mounting (fixing) a sensor in the bore, wherein the bore defines a radial and an axial direction. The clamping sleeve comprises: a sleeve body for receiving the sensor and at least one spring tongue with a free end and a fastening end, wherein said spring tongue is fastened by the fastening end to the sleeve body and the free end can be swung against a spring force. Thus, the spring tongue can support the sensor against the bore while exerting the spring force if the clamping sleeve is situated, together with the sensor, at least partially in the bore. The clamping sleeve is formed from rolled steel in such a way that a rolling direction of the rolled steel extends between the fastening end and the free end.

The sleeve body can at least partially have a cylindrical shape and extend at least partially between the sensor and the bore in the axial direction if the clamping sleeve is situated, together with the sensor, in the bore. The clamping sleeve thus defines an axial direction (in the insertion direction) and a radial direction perpendicular thereto.

In further exemplary embodiments, a plurality of spring tongues can be formed along the sleeve body such that an inserted sensor is supported from a number of sides in the bore by a stress between the sensor and the bore. The rolling direction of the rolled steel can be oriented for example in the insertion direction of the clamping sleeve into the bore (or oppositely thereto). The spring tongues can be bent between the free end and the fastening end in order thereby to provide the spring force which acts between the bore and the sensor.

In further exemplary embodiments, the bore can have a bore surface. Optionally, the spring tongue can have a punching burr which, after inserting the sleeve body into the bore, extends radially inward from the bore surface. The sleeve body can optionally have a punching burr which can extend radially inward or radially outward (i.e. can point in the same direction as the punching burr of the spring tongue or oppositely thereto).

A punching burr is understood to mean a burr which is formed when a punching operation is carried out and produces (microscopic) projections along the punched edge in the punching direction. Oppositely to the punching direction, the exemplary spring tongue or the sleeve body will have a rounded-off surface structure such that the punching burr can be felt on one side, whereas a smooth or slightly rounded-off surface has resulted on the other side.

The free end can optionally be rounded off, with the free end of rounded-off design being able to be formed for example by grinding or shaping in such a way that the free end has only a minimum contact with the bore (after inserting the clamping sleeve). This means that it is possible for the free end to slide along the bore without problems since the frictional forces between the free end and the bore are minimized. For example, the free end can be formed as a spherical shape, or as an elongate hump by appropriate stamping operations. There are in particular two possibilities for the rounded-off shape. Firstly, a rounding-off can be formed in a plan view of the spring tongue. Secondly, the rounding-off can arise in a cross-sectional view through a longitudinal direction of the spring tongue.

In further exemplary embodiments, the free end of the spring tongue can have a stamped-down portion in order, for example, to achieve a punctiform contact. Stamping-down is to be understood as meaning a nonelastic pressure deformation which presses a part of the material in a stamping direction. Stamping-down ensures that sharp edges or corners of the free end, if they are still present, do not come into contact with the bore and can thus not increase the resistance during insertion into the bore. This is particularly advantageous when the free end is bent (along the spring tongue) away from the sensor toward the surface of the bore in order thereby to provide a spring force between the bore and the sensor. Here, the free end comes directly into contact with the bore, with the result that as low a friction as possible between the free end and the bore is advantageous.

In further exemplary embodiments, the free end can be situated ahead of the fastening end (in an insertion direction into the bore). However, in further exemplary embodiments, the free end can also be situated (with respect to the insertion direction into the bore) behind the fastening end.

Optionally, the free end of the spring tongue, in its swinging direction (working range of the spring), can terminate flush with the sleeve body, at least as long as the spring tongue exerts no spring force (for example if the sensor is not situated in the clamping sleeve). This means that the free end of the spring tongue does not project radially outward from the sleeve body. Thus, when inserting the clamping sleeve into the bore (if the sensor has not yet been inserted), the free end can come into contact with the bore only together with the surface of the sleeve body. With a flush termination, it is not possible for only the free end to come into contact with the bore while the sleeve body has no contact to the surface of the bore. Therefore, the free end cannot hinder the insertion of the clamping sleeve.

In further exemplary embodiments, the free end of the spring tongue, in its swinging direction (working range of the spring), can be arranged offset relatively inward with respect to the sleeve body, at least as long as the spring tongue exerts no spring force. Thus, in this case too, when inserting the clamping sleeve into the bore, the free end has no contact with the bore surface, with the result also that no friction can occur between the free end and the bore. However, it should be noted that, when inserting the sensor into the clamping sleeve, the spring tongue can be bent outward. This takes place for example if the spring tongue is bent radially slightly inward such that an inserted sensor would press out the spring tongue and would thus press the free end against the surface of the bore. Therefore, it can be advantageous if the sensor is inserted only after the clamping sleeve has been inserted into the bore.

Optionally, the clamping sleeve further has at least one stop (or a fixing tab) which extends radially outward. The stop serves for fixing the clamping sleeve in the bore, with the result that the sleeve body can be introduced only so far into the bore until the stop butts against a boundary of the bore and thus prevents deeper insertion.

In further exemplary embodiments, the sleeve body optionally has a longitudinal gap in the axial direction. Optionally, a stamped portion can be formed which is directed radially inward. A further stamped portion can be optionally formed along a circumferential direction on a front end in the insertion direction. The longitudinal gap allows the clamping sleeve to be radially compressed in order thereby to facilitate insertion of the clamping sleeve. This is particularly advantageous when the diameter of the clamping sleeve is selected in such a way that it fits accurately with the bore and thus ensures a firm hold of the sensor within the clamping sleeve and the bore. It goes without saying that the gap can extend over the entire axial extent of the clamping sleeve or else can be formed only on a part thereof.

In further exemplary embodiments, the sleeve body, radially oppositely from the longitudinal gap, is configured to be reinforced by comparison with other portions in order to suppress an oval deformation of the sleeve body if the sleeve body is laterally compressed as seen from the longitudinal gap. A deformation refers here to all elastic distortions which build up a stress in the clamping sleeve and lead to a change of shape of the clamping sleeve. Thus, the compression of the sleeve body in order to insert it into the bore is also a deformation which should, according to the invention, occur as wide as possible such that, although the sleeve body has a relatively small radius, it still maintains a substantially circular shape. Without such a material reinforcement or inhomogeneous material distribution along the circumferential direction, a compression of the opposite sleeve parts would lead to an oval shape resulting. This would make it more difficult to insert the clamping sleeve into the bore.

In further exemplary embodiments, the other portions optionally have openings whose sizes are selected such that, during compression, the other portions are bent more strongly in order thereby to prevent the oval deformation.

Optionally, additional material and/or no or smaller openings and/or reinforcing elements can thus be formed in the reinforced portion (by comparison with the other portions).

In further exemplary embodiments, the material comprises a rolled steel of the type 1.6908 or 1.4310. These types refer to the steel types which are classified in Europe according to material numbers by the steel institute VDEh (Verein Deutscher Eisenhüttenleute). Apart from these specific steel types, use can also be made, however, of other types. The invention is not limited to specific steel types.

The present invention also relates to a method for producing a clamping sleeve which can be inserted into a bore and which is suitable for receiving and for fixing a sensor in the bore, wherein the bore defines a radial direction and an axial direction. The method comprises the following steps: providing a rolled steel having a rolling direction; forming at least one spring tongue with a free end and a fastening end by punching the rolled steel in a punching direction, wherein the rolling direction of the rolled steel extends between the fastening end and the free end; and forming a sleeve body for receiving the sensor, wherein the fastening end is fastened to the sleeve body and the free end can be swung against a spring force such that the spring tongue supports the sensor against the bore while exerting the spring force if the clamping sleeve is situated, together with the sensor, at least partially in the bore.

In further exemplary embodiments, the punching direction is chosen to be radially inward. The method can further comprise a rolling of the rolled steel in order to form a cylindrical sleeve body with a longitudinal gap. In addition, it is optionally possible for all the above-described features to be correspondingly implemented in the production method.

The exemplary embodiments of the present invention will be better understood from the following detailed description and the accompanying drawings of the different exemplary embodiments which should not be understood, however, to restrict the disclosure to the specific embodiments, but merely serve for explanation and for understanding.

DETAILED DESCRIPTION

Figure 1:
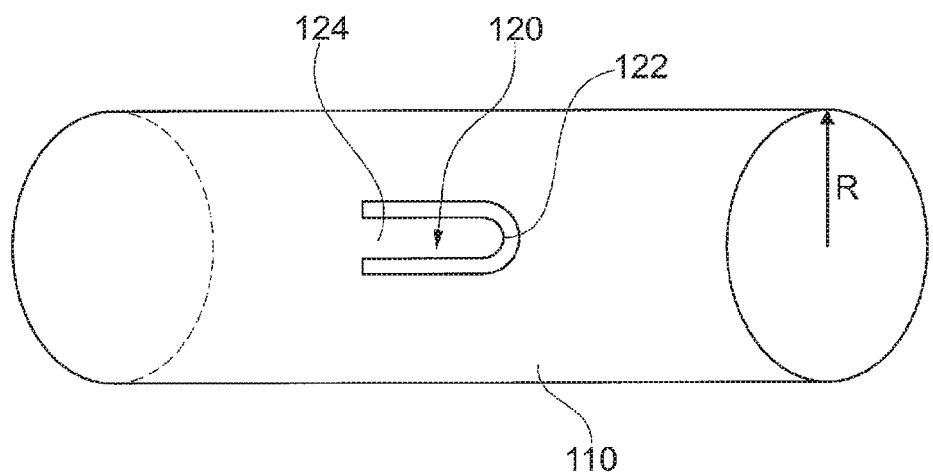
FIG. 1 shows a clamping sleeve according to one exemplary embodiment of the present invention.

FIG. 1 shows a clamping sleeve according to one exemplary embodiment of the present invention. The clamping sleeve shown can be inserted into a bore 102 and is suitable for receiving and for fixing a sensor 105 in the bore. The bore 102 defines a radial and an axial direction. The clamping sleeve comprises: a sleeve body 110 for receiving the sensor 105; and at least one spring tongue 120 with a free end 122 and a fastening end. The fastening end is fastened to the sleeve body 110 and the free end can be swung against a spring force such that the spring tongue 120 supports the sensor against the bore 102 while exerting the spring force if the clamping sleeve is situated, together with the sensor, at least partially in the bore 102. The clamping sleeve is formed from rolled steel in such a way that a rolling direction of the rolled steel extends between the fastening end 124 and the free end 122.

Figure 2A:
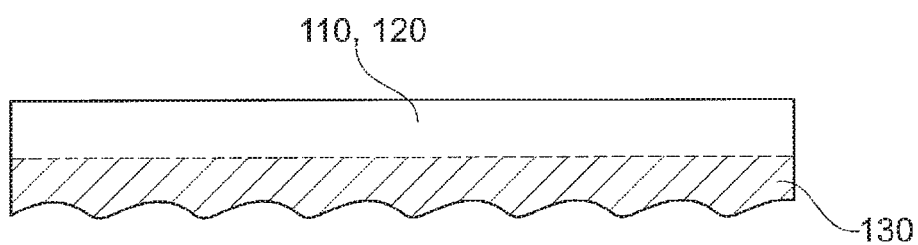
FIGS. 2a and 2b illustrate a punching burr on a part of the sleeve body or of the spring tongue.
Figure 2B:
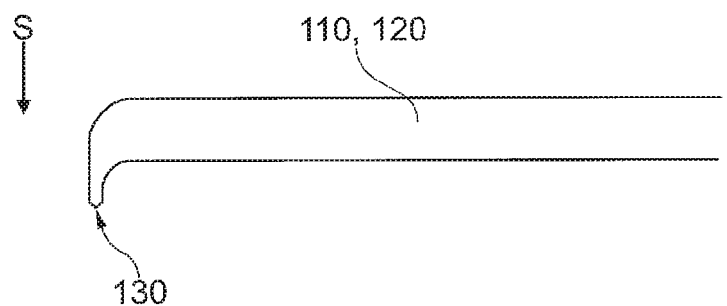

FIGS. 2*a* and 2*b* illustrate a punching burr which can be formed for example in a part of the sleeve body 110 or of the spring tongues 120 and results through a punching operation in a punching direction S. It can be seen in FIG. 2*a* that the punching burr 130, which has an irregular shape and is caused by the punching operation, extends below the sleeve body 110 or the spring tongues 120. FIG. 2*b* depicts a cross-sectional view which shows the punching burr 130 as a projection in the punching direction S. Opposite to the punching direction S, here, the surface of the sleeve body 110 or the spring tongue 120 is rounded off, whereas it tapers in the punching direction S in the form of a sharp burr 130.

Figure 3:
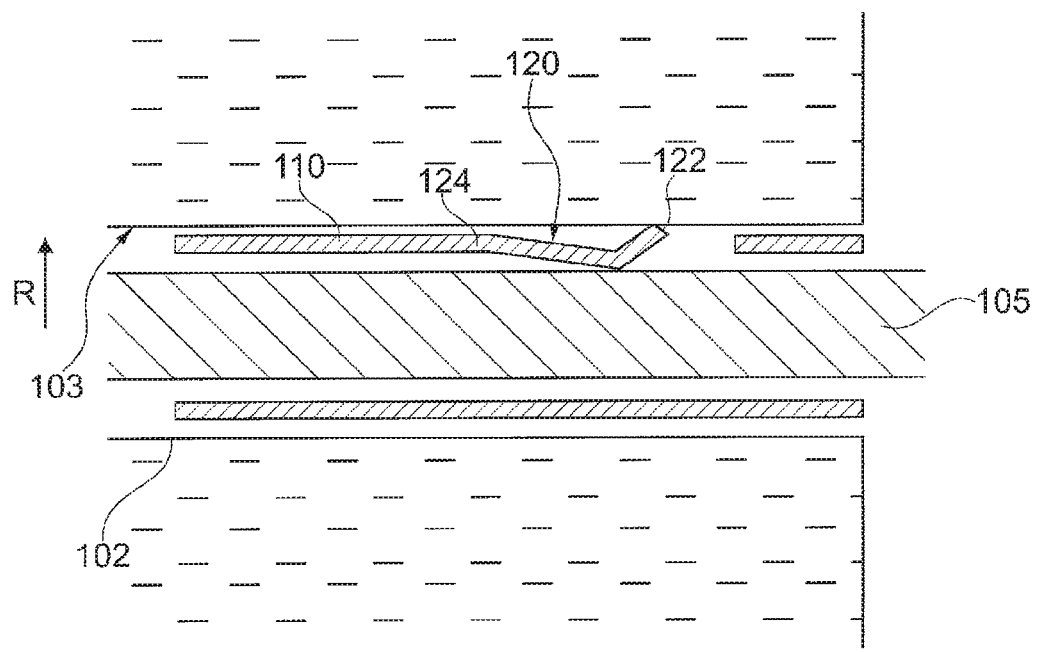
FIG. 3 shows a clamping sleeve which is inserted together with the sensor in the bore.

FIG. 3 shows an exemplary embodiment in which the clamping sleeve is inserted, together with the sensor 105, into the bore 102 such that the sleeve body 110 is situated between the sensor 105 and the bore 102. What is shown is a cross-sectional view through the spring tongue 120 along the insertion direction of the clamping sleeve into the bore 102. In the exemplary embodiment shown, the spring tongue 120 is bent. Beginning with the fixed end 124 (fastening end) by which it is fastened to the sleeve body 110, the spring tongue 120 first bends toward the sensor 105, contacts the latter and then extends toward the bore 102, the surface 103 of which is contacted by the free end 122. Therefore, the clamping sleeve supports the sensor 105 against the bore 102, with the spring force of the spring tongue 120 providing a sufficient pressing force in order to securely hold and displaceably mount the sensor 105 in the bore.

In the exemplary embodiment shown, the free end 122 is illustrated as rounded-off and has no punching burr. Although a punching burr is present in further exemplary embodiments, it points away from the surface of the bore 102 (i.e. oppositely to the radial direction R), with the result that the surface 103 of the bore 102 comes only into contact with the rounded-off part of the spring tongue 120. For example, the rounding-off can be achieved by a stamping-down operation or by a shaping operation which produces a smooth surface and minimizes a contact area to the surface 103 of the bore 102. Such a punching burr would not come into contact with the bore 102 and thus (when inserting the sleeve body 110 into the bore 102) also does not increase the friction between the free end 122 and the bore 102.

Figure 4A:
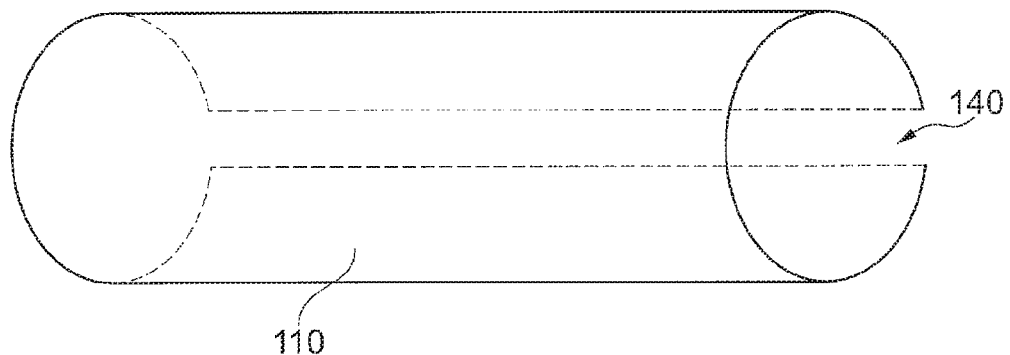
FIG. 4 show further exemplary embodiments for a clamping sleeve.
Figure 4B:
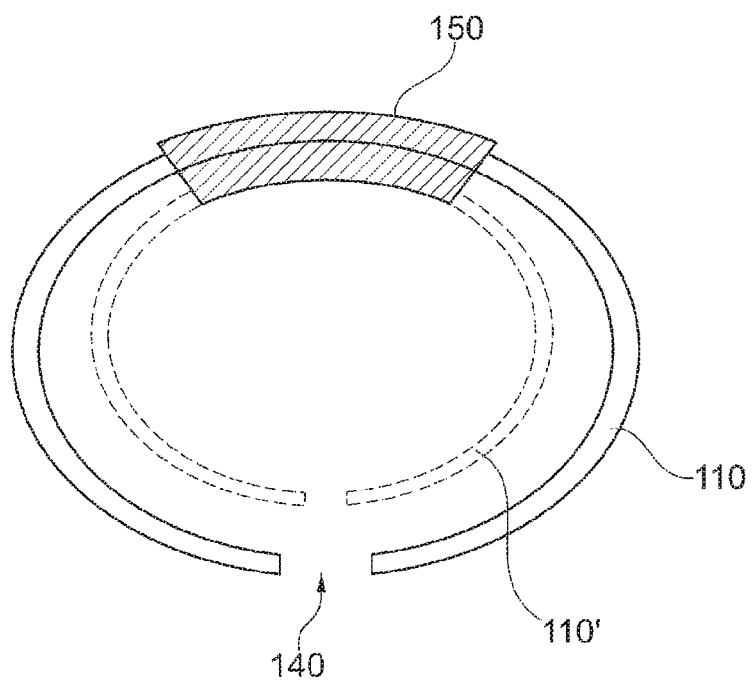

FIGS. 4*a* and 4*b* show an embodiment in which the sleeve body 110 has a gap 140.

FIG. 4*a* shows a three-dimensional view of the clamping sleeve which extends in an axial direction and is configured to be substantially circular perpendicularly to the axial direction. The gap 140 extends along the entire axial direction and allows the sleeve body 110 to be able to be compressed oppositely to the radial direction. Here, the gap 140 is reduced and the insertion of the sleeve body 110 into the bore 102 is facilitated (see FIG. 3).

FIG. 4*b* shows a cross-sectional view perpendicularly to the axial direction, wherein the gap 140 is arranged at the bottom. According to exemplary embodiments, a portion 150 is formed on an opposite side to the gap 140 and has an increased strength (lower elasticity) by comparison with the remaining sleeve body 110. This increased strength serves to ensure that, during compression of the sleeve body 110 (from right and left in FIG. 4*b*), a deformed sleeve body 110' is formed which is likewise substantially circular but has a smaller radius and a reduced gap 140. Since the strength along the portion 150 is greater than in the remaining region of the sleeve body 110, a compression results in the other parts of the sleeve body 110 (outside of the portion 150) deforming more greatly than the portion 150. This can be achieved for example in that openings are scarcely formed along the portion 150, for example no spring tongues 120 or additional ribs or similar fastening structures are provided, which provide the sleeve body 110 with increased strength. It is also possible that a plurality of openings (not visible in this figure) are formed, or openings have a larger axial extent, along the remaining sleeve body 110 (i.e. outside of the portion 150), which means that the remaining portions can be deformed more greatly than the portion 150.

Figure 5:
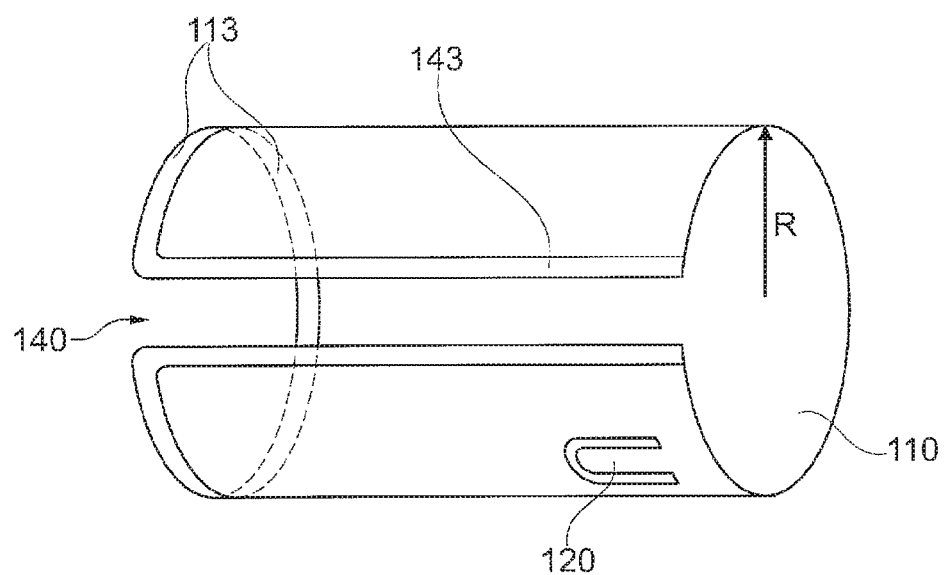
FIG. 5 shows a further exemplary embodiment for a clamping sleeve.

FIG. 5 shows a three-dimensional view of a further exemplary embodiment of the clamping sleeve with a gap 140 and a spring tongue 120. In the exemplary embodiment of FIG. 5, a stamped-down portion 113 is formed along a circumferential direction of the sleeve body 110 and bevels the sleeve body 110 inward counter to the radial direction R. This stamped-down portion 113 facilitates insertion of the clamping sleeve into the bore 102, since slight surface unevenness of the bore 102 do not result in the clamping sleeve catching upon insertion, but the flattened portion 113 can move easily thereover. This facilitates the mounting of the sleeve body 110 in the bore 102. Also formed in the exemplary embodiment of FIG. 5 is a further stamped-down portion 143 along the gap 140. The further stamped-down portion 143 facilitates compression of the clamping sleeve, for example beyond the point when the gap 140 completely disappears and partial overlapping of the clamping sleeve body 110 on both sides of the gap 140 occurs.

Such stamped-down portions can also be formed along the spring tongue 120 in order thereby to reduce friction between the clamping sleeve and the bore 102 or between the sleeve body 110 and the sensor 105.

Figure 6:
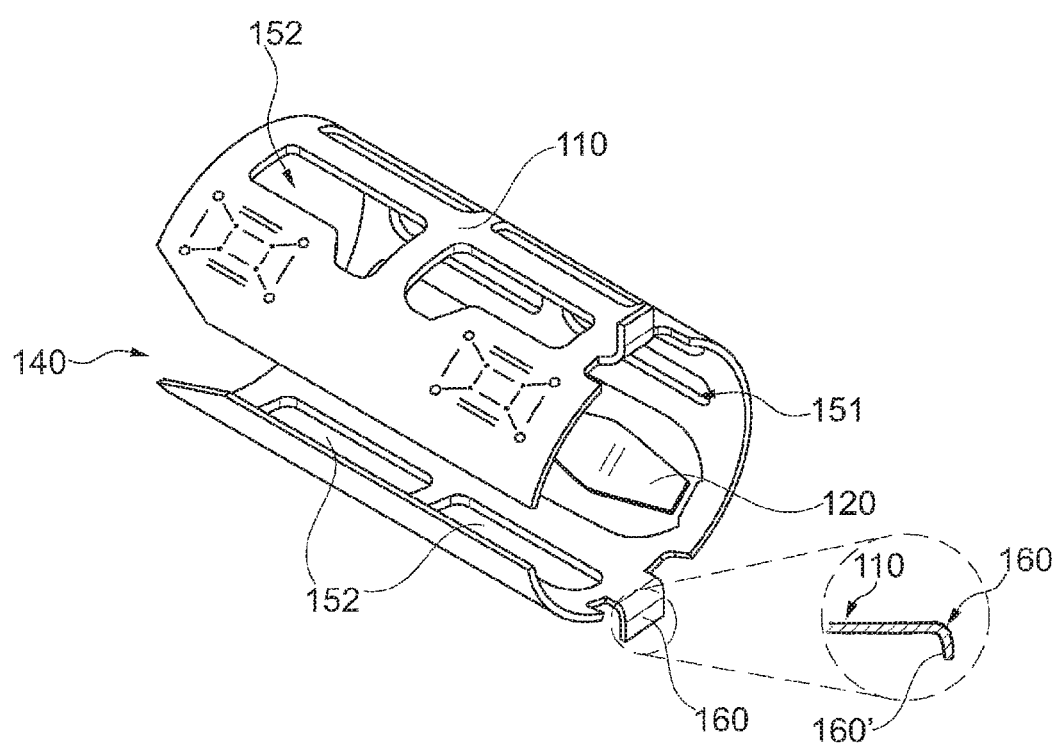
FIG. 6 shows an exemplary embodiment for a clamping sleeve with openings.

FIG. 6 shows a three-dimensional view of a clamping sleeve with a plurality of openings 151, 152 which are formed along a circumferential direction of the clamping sleeve. The exemplary embodiment of FIG. 6 also has a gap 140 and a plurality of spring tongues 120 (only one of which is visible). The openings 151, 152 comprise first openings 151 and second openings 152, wherein the first openings 151 are formed on an opposite portion of the gap 140 and have a smaller dimension than the second openings 152, which are arranged laterally with respect to the gap 140. The second openings 152 are situated for example in that region in which the clamping sleeve is compressed by a user when the clamping sleeve is inserted into the bore 102. The second openings 152 of larger design, in particular if the sleeve body 110 is configured to be thinner there in the axial direction, lead to this portion of the clamping sleeve or of the sleeve body 110 being able to deform more easily than that portion in which the first openings 151 are formed. This can, as said, be achieved in that the axial longitudinal extent of the first openings 151 is smaller than the axial longitudinal extent of the second openings 152.

Furthermore, the clamping sleeve has, as can be seen in FIG. 6, stops 160 (or fixing tabs) which serve to axially fix the clamping sleeve during insertion into the bore 102, with the result that the clamping sleeve can be inserted into the bore 102 only so far until the stops 160 prevent further penetration of the clamping sleeve into the bore 102. Further details of the stops 160 can be seen in the enlarged view (FIG. 6*a*). In particular, the stops 160 can have a punching burr which are situated either on an inner edge 160' or an opposite outer edge of the stop 160. For example, the stops 160 can be produced by bending a portion of the sleeve body 110 such that the inner edge 160' can be defined as a bending inner radius with respect to the bending direction.

Figure 7:
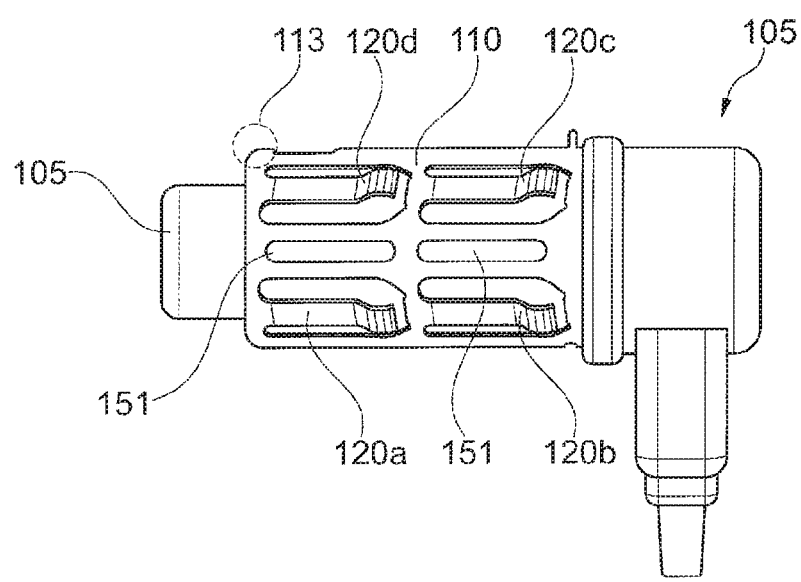
FIG. 7 shows a further exemplary embodiment for a clamping sleeve with inserted sensor.

FIG. 7 shows an exemplary embodiment in which the sensor 105 is inserted into the clamping sleeve. In the exemplary embodiment shown in FIG. 7, the clamping sleeve has at least four spring tongues 120a, 120b, 120c and 120d. There can additionally be seen the first openings 151 which are formed along the circumferential direction of the clamping sleeve between two adjacent spring tongues 120. Also visible in the exemplary embodiment of FIG. 7 is the stamped-down portion 113 which, as shown in FIG. 5, constitutes a radially inwardly directed beveling of the sleeve body 110 along a circumferential direction of the axial edge (in the insertion direction). The gap 140 is not visible in FIG. 7. It is situated on the opposite side of the sleeve.

Figure 8A:
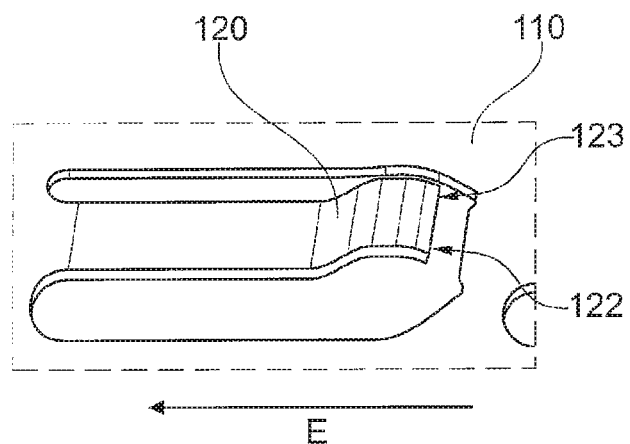
FIG. 8 show exemplary embodiments for the orientation of the spring tongues of the clamping sleeve.
Figure 8B:
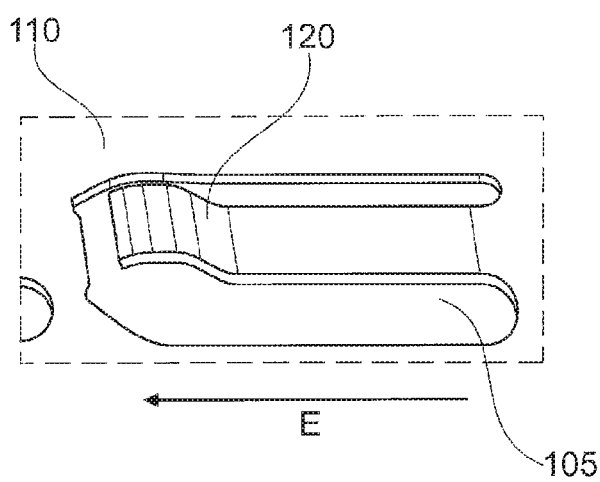

FIGS. 8a and 8b show two exemplary embodiments with differently oriented spring tongues 120. In the exemplary embodiment of FIG. 8a, the spring tongue 120 is formed oppositely to an insertion direction E of the clamping sleeve into the bore 102, whereas, in the exemplary embodiment of FIG. 8b, the spring tongue 120 extends in the insertion direction E of the clamping sleeve into the bore 102.

In addition, in the exemplary embodiments, as can be seen in FIGS. 8a and 8b, the free end 122 is edge-shaped with corners 123. According to the aforementioned exemplary embodiments, the corners 123 can also be rounded off. In addition, a punching direction can be chosen such that it points radially inward in order thereby to reduce friction between the edges or corners 123 of the free end 122 and the bore 102.

As a result, improved ease of insertion becomes possible. In addition, as described above, the problem of a possible blocking when inserting the clamping sleeve into the bore 102 can be avoided by the free end 122 of the spring tongue 120 being formed flush with the sleeve body 110 or slightly inwardly offset. Thus, during insertion, the free end 122 does not come into contact with the surface 103 of the bore 102. Advantageously, the sensor 105 is inserted only after the clamping sleeve has been inserted into the bore 102.

An increased ease of inserting the sensor 105 into the sleeve body 110 is achieved in the exemplary embodiment of FIG. 8b since the spring tongue 120 extends in the insertion direction of the sensor 105 into the sleeve body 110 and thus an easier upward bending of the spring tongue 120 is made possible. By contrast to conventional clamping sleeves in which the spring tabs projects on the outside (extend radially further outward than the sleeve body 110), the spring tongues 120 advantageously terminate flush with the sleeve body 110 and do not project beyond the outside diameter.

In further exemplary embodiments, the free end 122, as shown in FIG. 1 or 3, is rounded off, wherein a radius of the rounding-off is chosen to be smaller than the radius of the bore 102. This ensures that, in the most favorable case, only one bearing point is obtained in the bore 102, with the result that the abrasion when inserting the sensor 105 is minimized in order thereby to allow uniform insertion of the sensor. In particular, the so-called stick-slip effect (sudden overcoming of static friction) is minimized. This also applies to the application with the sensor 105.

The minimization of the bearing surface of the spring tongue 120 reduces the friction between the bore 102 and the spring tongue 120 under dynamic loading.

Various aspects of the exemplary embodiments can also be summarized as follows.

An improvement of the spring tabs (spring tongues 120) can be achieved by changing the rolling direction of the rolled steel and/or the punching direction when forming the clamping sleeve. In particular, the use of a rolled steel (such as, for example, the steel with the designation 1.4310 or 1.6908) can afford the following advantages:

(i) Less material is necessary since this material has a higher strength and thus can be formed thinner than comparative materials of the conventional clamping sleeves, with the same spring properties being achieved.

(ii) The clamping sleeve is, as a result of using these materials, lighter than the conventional nonferrous metal alloys.

(iii) Higher dynamics are achieved, which means that the sleeve also withstands undamaged relatively large vibrations over a long time. In particular, there is no material fatigue or only considerably later than is customary with conventional materials.

(iv) A higher ease of insertion and a greater ease of mounting is achieved since the insertion force is more homogeneous. In particular, the spring tabs 120 with round edges bring about reduced friction between the spring tongues 120 and the bore 102 and the improved ease of insertion.

These advantages are achieved in particular when the punching direction and the rolling direction of the material are changed such that the rolling direction extends along the spring tongue (in order thereby to achieve the desired high dynamics) and the punching direction is chosen such that as far as possible no or little friction is generated and there results a longer life for the spring properties of the spring tongue 120.

Further advantageous embodiments also relate to possible punching direction changes in which the punching direction, for example along the circumferential direction of the sleeve body 110, is chosen to be different than along the spring tongue 120.

Further exemplary embodiments related to a stamping-down of the corners 123 and edges of the spring tongue 120. Here, the stamping can also take place upward (i.e. toward the bore surface 103), with the result that a sphere or a longitudinal shape is obtained as bearing surface of the spring tongue 120 in the bore 102.

Further exemplary embodiments also related to an inward stamping of the longitudinal edges in the rolling direction. This ensures easier insertion of the clamping sleeve into the bore 102. The rolling direction refers to the production process in which the sleeve is first formed as a flat metal sheet and is then rolled into the cylindrical shape. In further exemplary embodiments, stamping of the front edges (i.e. the end and longitudinal edges) in the installation direction took place.

In addition, the modulus of elasticity is considerably larger than in the case of a nonferrous metal alloy, such as, for example, copper beryllium, with the result that the sleeve according to the invention can be formed thinner than the conventional sleeves. By using the new material (rolled steel), the sleeve can be produced in a thickness of 0.1 to 0.7 mm or between 0.3 and 0.5 mm or less than 0.6 mm.

In addition, the specific gravity of steel is less, with the result that the clamping sleeve according to exemplary embodiments is considerably lighter than the conventional clamping sleeves. In addition, the service life is considerably increased by using the material 1.4310, with the result that there occurs no fatigue of the clamping sleeve. Moreover, the punching direction in the case of the fixing tabs can be maintained the same.

In order to prevent the occurrence of an oval shape during compression, reinforcements of the sleeve contour can be formed in order thereby to obtain an optimized round shape during compression. For example, webs and holes or beads (as a reinforcing structure) can be formed opposite the longitudinal gap 140. Thus, during lateral compression, the stress which occurs is better distributed over the entire circumference.

The features of the invention which are disclosed in the description, the claims and the figures can be essential both individually and in any desired combination for implementing the invention.

The List of reference signs is as follows:

102 Bore
103 Surface of the bore
105 Sensor
110 Sleeve body
110' Deformed sleeve body
113 Stamped-down portion
120 Spring tongue (a, b, c, . . . )
122 Free end of the spring tongue
123 Corners
124 Fastening end of the spring tongue
130 Punching burr
140 Longitudinal gap
143 Further stamped-down portion
150 Reinforced portion
151 First openings
152 Second openings
160 Stops of the sleeve
160' Inner edge
E Insertion direction
S Punching direction
R Radial direction

The invention claimed is:

1. A clamping sleeve, which is insertable into a bore and which is suitable for receiving and for displaceably mounting a sensor in the bore, the bore defining a radial direction and an axial direction, comprising:
   a sleeve body to receive the sensor; and
   at least one spring tongue with a free end and a fastening end, wherein the fastening end is fastened to the sleeve body and the free end is swingable against a spring force such that the spring tongue supports and displaceably mounts the sensor against the bore while exerting the spring force if the clamping sleeve is situated, together with the sensor, at least partially in the bore;
   wherein the clamping sleeve is formed from rolled steel so that a rolling direction of the rolled steel extends between the fastening end and the free end.

2. The clamping sleeve of claim 1, wherein the bore has a bore surface, and wherein the spring tongue has a punching burr which, after inserting the sleeve body into the bore, extends radially inward from the bore surface, and the sleeve body has a punching burr which extends radially inward or radially outward.

3. The clamping sleeve of claim 1, wherein the free end is configured to be rounded off such that a contact area of the spring tongue with a bore surface is reduced during insertion and application.

4. The clamping sleeve of claim 3, wherein the free end has a stamped-down portion in order to minimize a contact area.

5. The clamping sleeve of claim 1, wherein, in an insertion direction into the bore, the free end is situated ahead of the fastening end.

6. The clamping sleeve of claim 5, wherein the free end of the spring tongue, in its swinging direction, terminates flush with the sleeve body if the spring tongue exerts no spring force.

7. The clamping sleeve of claim 5, wherein the free end of the spring tongue, in its swinging direction, is arranged so as to be offset relatively inward with respect to the sleeve body if the spring tongue exerts no spring force.

8. The clamping sleeve of claim 1, wherein, in an insertion direction into the bore, the free end is situated behind the fastening end.

9. The clamping sleeve of claim 1, further comprising:
   at least one stop which extends radially outward from the sleeve body such that the sleeve body is insertable into the bore only up to this stop, wherein a punching burr is situated on an inner edge or an outer edge of the stop.

10. The clamping sleeve of claim 1, wherein the sleeve body includes a longitudinal gap in an axial direction and a stamped portion which is directed radially inward, wherein the stamped portion extends along a circumferential direction on a front end in the insertion direction.

11. The clamping sleeve of claim 10, wherein, radially oppositely from the longitudinal gap, the sleeve body is configured to be reinforced by comparison with other portions to suppress an oval deformation of the sleeve body if the sleeve body is laterally compressed as viewed from the longitudinal gap.

12. The clamping sleeve of claim 11, wherein the other portions have openings whose sizes are chosen such that the compression leads to a deformation which is increased by comparison with the reinforced portion so as to suppress the oval deformation.

13. The clamping sleeve of claim 10, wherein, by contrast to the other portions, additional material is formed and/or no or smaller openings are formed and/or reinforcing elements are formed in the reinforced portion.

14. The clamping sleeve of claim 1, wherein the sleeve body and/or the spring tongue includes a material with a material number of 1.4310 or 1.6908.

15. A method for producing a clamping sleeve, which is insertable into a bore and which is suitable for receiving and for fixing and mounting a sensor in the bore, wherein the bore defines a radial direction and an axial direction, the method comprising:
   providing a rolled steel having a rolling direction;
   forming at least one spring tongue with a free end and a fastening end by punching the rolled steel in a punching direction, wherein the rolling direction of the rolled steel extends between the fastening end and the free end; and
   forming a sleeve body for receiving the sensor, wherein the fastening end is fastened to the sleeve body and the free end is swingable against a spring force such that the spring tongue supports and displaceably mounts the sensor against the bore while exerting the spring force if the clamping sleeve is situated, together with the sensor, at least partially in the bore.

* * * * *